(12) United States Patent
Messano

(10) Patent No.: US 6,840,825 B1
(45) Date of Patent: Jan. 11, 2005

(54) AMPHIBIOUS RECREATIONAL VEHICLE

(76) Inventor: Frank Messano, 2100 Heyneman La., Simi Valley, CA (US) 93085

(*) Notice: Subject to any disclaimer, the term of this patent is extended or adjusted under 35 U.S.C. 154(b) by 0 days.

(21) Appl. No.: 10/712,227

(22) Filed: Nov. 14, 2003

Related U.S. Application Data

(63) Continuation-in-part of application No. 10/177,314, filed on Jun. 24, 2002, now Pat. No. 6,679,543, which is a continuation-in-part of application No. 10/142,403, filed on May 10, 2002, now abandoned, which is a continuation-in-part of application No. 09/766,996, filed on Jan. 23, 2001, now Pat. No. 6,425,625.

(51) Int. Cl.$^7$ .................................................. B60F 3/00
(52) U.S. Cl. ................................. 440/12.52; 114/61.15; 114/61.16; 114/290
(58) Field of Search ........................... 114/61.15, 61.16, 114/344, 283, 290, 67 A; 440/12.5, 12.52, 12.53, 12.54

(56) References Cited

U.S. PATENT DOCUMENTS

| 1,634,932 | A | * | 7/1927 | Cook ....................... 440/12.54 |
| 3,161,246 | A | | 12/1964 | Meeker |
| 3,193,851 | A | | 7/1965 | Fiebelkom |
| 3,877,094 | A | * | 4/1975 | Kelley ......................... 114/344 |
| 3,941,074 | A | * | 3/1976 | Millerbernd ................. 114/344 |
| 5,243,924 | A | | 9/1993 | Mann |
| 5,687,669 | A | | 11/1997 | Engler |
| 6,237,988 | B1 | * | 5/2001 | Messano ...................... 296/165 |
| 6,425,625 | B1 | * | 7/2002 | Messano ...................... 296/156 |
| 6,679,543 | B2 | * | 1/2004 | Messano ...................... 296/175 |
| 2002/0153745 | A1 | | 10/2002 | Messano |

* cited by examiner

Primary Examiner—Sherman Basinger

(57) ABSTRACT

An amphibious recreational vehicle (motorhome, trailer, SUV, and the like) of conventional RV height, width, and length restricted dimensions necessary to travel on highways and roads, and which upon entering the water, the bottom of the vehicle expands outwardly and upwardly to form a fast planing, wide-beam, ground effects cathedral type double-tunnel hull. The hull makes use of a dynamic air cushion to augment the planing of the hulls, owing to the ground effect created by compression of the ram air stream (and water vapor) rushing through the two tapered tunnels separating the three hulls. The wheels of the vehicle are simultaneously raised out of the water to eliminate parasite drag. The resultant hull is substantially wider than the cabin, providing substantial ocean-going stability for the craft. The folded elements incorporated within the cabin rooftop, raise upward to form a traditional yacht flying bridge, complete with a windshield, steering station, seating, mast, and safety rails. The resultant watercraft closely approximates the off-shore speed, seaworthiness, performance, stability, cabin space, main deck space, and elevated flying bridge deck attributes of conventional yachts. And when on land, the craft is a fully functioning traditional recreational vehicle suited for fast highway travel, driving about towns, staying in RV parks, and camping in the wilderness. This amphibious recreational vehicle is an interrelated component divided from the inventor's previous Comprehensive Vehicle Construction And Hybrid Electric Drive System application.

23 Claims, 8 Drawing Sheets

AMPHIBIOUS RECREATIONAL VEHICLE

CROSS-REFERENCE TO RELATED APPLICATIONS

This is a continuation-in-part of application Ser. No. 10/177,314 filed Jun. 24, 2002, now U.S. Pat. No. 6,679,543 which is a continuation-in-part of application Ser. No. 09/766,996 filed Jan. 23 2001, now U.S. Pat. No. 6,425,625.

Application Ser. No. 10/177,314—Comprehesive Vehicle Construction And Hybrid Electric Drive System was a CIP application Ser. No. 10/142,403—Seating, Handrails & Canopy For Rooftop Systems, which relates to my previous U.S. Pat. No. 6,237,988—STREAMLINE ROOFTOP DECK FOR MOTORHOMES.

Application Ser. No. 10/142,403 is now abandoned.

FIELD OF THE INVENTION

The present invention relates to construction features of amphibious land and water craft, and more particularly an amphibious recreational vehicle that has all the attributes of a conventional recreational vehicle (motorhome, travel trailer, fifth-wheel trailer, van, SUV, and the like) when on land, and that has all the attributes, speed, stability, outside decks, and seaworthiness of a similar sized ocean-going marine craft (boat, yacht, houseboat, cabin cruiser, and the like) when in water.

Moreover, this present invention incorporates improvements and elements from my previously divided patent applications, continuation-in-part applications, and issued patents as follow: The streamline cowling rooftop deck assemblies for vehicles as described in my U.S. Pat. No. 6,237,988—STREAMLINE ROOFTOP DECK FOR MOTORHOMES which claims . . .

A vehicle rooftop deck system comprising:
a plurality of streamline cowlings enclosing the perimeter of a vehicle rooftop;
a plurality of rooftop safety handrails which fold down to a low profile for travel, which fold upward for use, which enclose the perimeter of the rooftop when in the upward position, and which affix to the rooftop;
a plurality of folding rooftop furniture, backs of which support the safety handrails, and which backs fold down to a low profile for travel and which backs fold upward for use, and furniture understructure which affixes the furniture to the rooftop and which affixes the streamline cowlings to the vehicle rooftop.

With additional claims that include . . .
wherein a raising and lowering convertible top unit is fixed in place within the deck.

And this present invention further relates to the invention in my U.S. Pat. No. 6,425,625—ROOFTOP DECK SYSTEMS FOR VEHICLES which claims . . .

A vehicle rooftop deck system comprising:
a cowling enclosing the perimeter of a vehicle rooftop;
a plurality of rooftop safety handrails which fold down to a low profile for travel, which fold upward for use, which enclose the perimeter of the rooftop when in the upward position;
a plurality of folding rooftop furniture which backs fold down to a low profile for travel and which backs fold upward for use.

With its additional claims . . .
Wherein the cowling is one-piece.
Wherein the cowling and furniture understructure are one-piece.
Wherein the cowling, furniture understructure and a rooftop deck are one-piece.
Wherein the one-piece cowling, furniture understructure and deck assembly form the roof of the vehicle.
Wherein the cowling and a deck are one-piece.
Wherein a number of sub-assemblies form a one-piece molded roof-deck structure.
Wherein a number of sub-assemblies form a one-piece monocoque roof-deck structure.
Wherein the system is also comprised of the vehicle roof with a hatchway through the roof to the interior of the vehicle.
Wherein the vehicle is a motorhome.
Wherein the vehicle is a trailer.
Wherein the vehicle is amphibious.
Wherein the furniture folding backs support the safety handrails.
Wherein the cowling encloses only a portion of the perimeter of a vehicle roof.
Wherein the safety handrails only enclose a portion of the perimeter of a vehicle roof.

And also, this present invention relates to my invention application Ser. No. 10/142,403, now abandoned,—SEATING, HANDRAILS & CANOPY FOR ROOFTOP DECK VEHICLES which claims.

A vehicle rooftop deck system comprising:
a raising and lowering roof-cover atop a vehicle exterior rooftop deck;
a rigid uppermost surface of said roof-cover;
a plurality of rooftop elements supporting said roof-cover;
a drive linkage connected to said elements for raising and lowering them in unison;
a power actuator to raise and lower said supporting elements;
a waterproof vertical raceway locating said actuator system below the rooftop deck;
a plurality of rooftop affixed safety handrails which raise and lower under said roof-cover;
and a plurality of rooftop affixed seating which raise and lower under said roofover.

With its additional claims . . .
Wherein the roof-cover is fabric.
Without a powered drive linkage.
Without locating the actuator system below the rooftop.
Without the safety handrails.
Without the seating.
Without a combination of one or more of the following . . . the powered drive linkage, without locating the actuator system below the rooftop, without safety handrails, or without the rooftop affixed seating.
Wherein the vehicle is a recreational vehicle (motorcoach, motorhome, trailer, camper, van, caravan, sport utility vehicle, and the like).
Wherein the vehicle is amphibious.
Wherein the vehicle is a watercraft (houseboat, boat, and the like).
Without the raising and lowering roof-cover.
Without a combination of one or more of the following . . . the roof-cover, handrails, the seating, the powered actuator.
And where the seating backs incorporate the handrails.

Further this present invention relates to my application Ser. No. 10/1177,314—Comprehensive Vehicle Construction And Hybrid Electric Drive System which claims . . .

A comprehensive vehicle construction and hybrid electric drive system comprising:
an arrangement of modular monocoque body components which assemble into a vehicle and into a watercraft consisting of . . .

a modular monocoque cowled roof with deck;

a modular monocoque front cabin component capable of supporting the roof without sidewalls;

a modular monocoque rear cabin component capable of supporting the roof without sidewalls;

a full-length vehicle widening slide-out unit which slides outward from the vehicle;

a modular multi-wheel land drive platform upon which the cabin components affix;

a modular hull platform upon which the cabin components affix;

a hinge-out sponson on each side of the modular hull platform;

and a drive arrangement consisting of . . .

a modular fuel driven electrical generator;

a modular electric motor-wheel-suspension unit;

a modular electric motor waterjet drive unit;

by which increasing the number of modular generators and the number of modular electric motor-wheel-suspension units increases the power of the vehicle.

With its additional claims . . .

A construction-drive arrangement as defined above, wherein the modular monocoque cowled roof is stiffened with an internal truss system.

A construction-drive arrangement as defined above, wherein the full-length vehicle widening slide-out unit rotates outwardly from the vehicle.

A construction-drive arrangement as defined above, wherein a modular electric motor-wheel-suspension unit incorporates regenerative braking.

A construction drive arrangement as defined above, wherein a computer unit controls the cycling of the generators, motors, and brakes.

A construction-drive arrangement as defined above, where the vehicle is a motorhome, motorcoach, van, SUV and the like.

A construction-drive arrangement as defined above, where the vehicle is a trailer.

A construction-drive arrangement as defined above, where the vehicle is an amphibian.

A construction-drive arrangement as defined above, where the vehicle is a watercraft.

A construction-drive arrangement as defined above, where the vehicle has four or more wheels per side arranged in single file.

A construction-drive arrangement as defined in above, where the amphibian has two or more single file wheels in each hinged outward sponson.

A vehicle construction arrangement comprising:

a modular monocoque cowled roof with deck;

a modular monocoque front cabin component capable of supporting the roof without sidewalls;

a modular monocoque rear cabin component capable of supporting the roof without sidewalls;

a full-length vehicle widening slide-out unit which rotates outward from the vehicle;

a modular land drive platform upon which the cabin components affix;

a modular hull platform upon which the cabin components affix;

a hinge-out sponson on each side of the modular hull platform;

and an arrangement of the modular monocoque components which assemble into a recreational vehicle and into a watercraft.

With its additional claims . . .

A vehicle construction arrangement as defined above, wherein the modular monocoque cowled roof is stiffened with an internal truss system.

A vehicle construction arrangement as defined above, wherein the full-length vehicle widening slide-out unit rotates out from the vehicle.

A vehicle construction arrangement as defined above, where the vehicle is a motorhome, motorcoach, van, SUV and the like.

A vehicle construction arrangement as defined above, where the vehicle is a trailer.

A vehicle construction arrangement as defined above, where the vehicle is an amphibian.

A vehicle construction arrangement as defined above, where the vehicle is a watercraft.

A vehicle construction arrangement as defined above, where the vehicle has four or more wheels per side arranged in single file.

A vehicle construction arrangement as defined above, where the amphibian has two or more single file wheels in each hinged outward sponson.

A vehicle drive arrangement comprising:

a modular fuel driven electrical generator;

a modular electric motor-wheel-suspension unit;

a modular electric motor waterjet drive unit;

an arrangement where increasing the number of modular generators and the number of modular electric motor-wheel-suspension units increases the power of the vehicle;

and an arrangement of the modular components which assemble into a recreational vehicle and into a watercraft.

With its additional claims . . .

A drive arrangement as defined above, wherein a modular electric motor-wheel-suspension unit incorporates regenerative braking.

A drive arrangement as defined above, wherein a computer unit controls the cycling of the generators, motors, and brakes.

A drive arrangement as defined above, where the vehicle is a motorhome, motorcoach, van, SUV and the like.

A drive arrangement as defined above, where the vehicle is a trailer.

A drive arrangement as defined above, where the vehicle is an amphibian.

A drive arrangement as defined above, where the vehicle is a watercraft.

A drive arrangement as defined above, where the vehicle has four or more wheels per side arranged in single file.

A drive arrangement as defined above, where the amphibian has two or more single file wheels in each hinged outward sponson.

A recreational vehicle (motorhome, motorcoach, trailer, van, SUV and the like) construction arrangement comprising:

a modular monocoque cowled roof with deck;

and a nearly full-length vehicle widening slide-out unit.

With its additional claim . . .

A recreational vehicle construction arrangement as defined above, wherein the slide-out rotates outwardly from the vehicle.

Lastly, this present invention relates to my application Ser. No. 10/177,314 filed Jun. 24, 2002, now U.S. Pat. No. 6,679,543, which was amended Aug. 26, 2003, which is a continuation-in-part of application Ser. No. 09/766,996, filed Jan. 23, 2001, now U.S. Pat. No. 6,425,625 and which claims:

A recreational vehicle construction arrangement comprising:
- a modular front-end cap and rear-end cap, a deck component, and a roof component;
- an above the roof stiffening system which spans the vehicle front-end cap and the rear-end cap;
- and a full-length vehicle widening slide out unit of a length which reaches substantially from a rear edge of the vehicle front-end cap to a front edge of the vehicle rear-end cap.

With its additional claims . . .

The recreational vehicle construction arrangement as defined above, wherein the slide out extends laterally and pivots to further increase the interior space of the vehicle.

The recreational vehicle construction arrangement as defined above, wherein the roof stiffening system is a truss comprising an assemblage of members forming a rigid framework spanning the vehicle end caps.

The recreational vehicle construction arrangement as defined above, wherein the roof stiffening system is a monocoque construction in which inner and outer rooftop cowling sections, and sidewall skins carry the stresses of the roof structure.

The recreational vehicle construction arrangement as defined above, comprising a second full-length slide-out on another side of the vehicle.

The recreational vehicle construction arrangement as defined above, wherein the full-length slide out is in combination with other length slide outs in the vehicle.

The recreational vehicle construction arrangement as defined above, wherein the vehicle front-end cap and the vehicle rear-end cap are each a self-supporting structure and said roof component is a free spanning roof between said end caps.

A recreational vehicle construction arrangement comprising:
- a modular front-end cap and rear-end cap, a deck component, and a roof component;
- a cowling enclosing the perimeter of a vehicle rooftop;
- a plurality of rooftop safety handrails which fold down to a low profile for travel, which fold upward for use, which enclose the perimeter of the rooftop when in the upward position;
- a plurality of folding rooftop furniture backs which fold down to a low profile for travel and which backs fold upward for use;
- an above the roof stiffening system which spans the vehicle front-end cap and the rear-end cap;
- and a full-length vehicle widening slideout unit of a length which reaches substantially from a rear edge of the vehicle front-end cap to a front edge of the vehicle rear-end cap.

With its additional claims . . .

The recreational vehicle construction arrangement as defined above, wherein the slideout extends laterally and pivots to further increase the interior space of the vehicle.

The recreational vehicle construction arrangement as defined above, wherein the roof stiffening system is a truss comprising an assemblage of members forming a rigid framework spanning the vehicle end caps.

The recreational vehicle construction arrangement as defined above, wherein the roof stiffening system is a monocoque construction in which inner and outer roof top cowling sections, and sidewall skins carry the stresses of the roof structure.

The recreational vehicle construction arrangement as defined above, comprising a second full-length slideout on another side of the vehicle.

The recreational vehicle construction arrangement as defined above, wherein the full-length slideout is in combination with other length slideouts in the vehicle.

The recreational vehicle construction arrangement as defined above, wherein the vehicle front-end cap and the vehicle rear-end cap are each a self-supporting structure and said roof component is a free spanning roof between said end caps.

A recreational vehicle construction arrangement comprising:
- a modular self-supporting front-end cap;
- a modular self-supporting rear-end cap;
- a modular free-spanning roof between said end caps;
- and a full-length vehicle widening slideout unit of a length which reaches substantially from a rear edge of the vehicle front-end cap to a front edge of the vehicle rear-end cap.

With its additional claims . . .

The recreational vehicle construction arrangement as defined above, wherein the slideout extends laterally and pivots to further increase the interior space of the vehicle.

The recreational vehicle construction arrangement as defined above, wherein the roof includes a truss comprising an assemblage of members forming a rigid framework spanning the vehicle end caps.

The recreational vehicle construction arrangement as defined above, comprising a second full-length slideout on another side of the vehicle.

The recreational vehicle construction arrangement as defined above, wherein the full-length slideout is in combination with other length slideouts in the vehicle.

This new Amphibious Recreational Vehicle invention herein is an enhancement of the aforementioned systems in my said patent applications and issued patents, incorporating some elements of the aforementioned inventions.

DISCUSSION OF THE PRIOR ART

While various examples of amphibious vehicles can be found in the prior art, most of these amphibious vehicles are designed to function well as conventional vehicles on land, with the added ability to temporarily cross over calm water at very slow speeds, and then to return to their natural environment on solid land. And where the prior art occasionally shows RV sized 30 foot and 40 foot long amphibians (usually a bus), their narrow width (limited to the maximum width permitted on highways) and lack of offshore type planing hulls limit their maximum water speed to 6–10 miles per hour, which is substantially below a typical cabin cruiser's travel speed of 25 to 40 miles per hour. Moreover, the narrow width, and tall height of bus-like amphibians further limit their use to calm water without rolling waves, in order to prevent them from capsizing. This combination of instability and inadequate speed in ocean waves eliminate their safe use in typical coastal and offshore ocean conditions.

In contrast, the natural environment of a conventional cabin cruiser (yacht, powerboat, houseboat, and the like) is the ocean, where it is designed to travel at high speed in ocean wave conditions, and to stay anchored offshore or berthed in marinas for months and even years at a time. Moreover, a typical cabin cruiser has enclosed living and entertaining cabins within the vessel, a secondary control station within the vessel, a deck to walk about the vessel in safety, a stern deck for dock boarding and for swimmers, a second-story rooftop flying bridge deck atop the cabin for primary control of the vessel and for passenger lounging & barbecuing, and for masts required to support running and anchor lights, radar and various antennas.

For a typical 40 foot flying bridge cabin cruiser, good stability at sea requires a hull with a width nearly double of the 8'–6" maximum width permitted for normal travel on national highways. And the height of this same cabin cruiser (including the flying bridge) with the vessel sitting on a trailer . . . exceeds the maximum heights permitted on the Nation's highways. As a result, these prior art amphibious land vehicles in the 30' to 40' length category cannot provide cabin cruiser performance and amenities, nor provide safety in normal coastal and offshore ocean conditions.

It is therefore a principal objective of the present invention to provide an amphibious recreational vehicle of conventional motorhome and travel trailer size and performance on land, and with conventional cabin cruiser performance, amenities, and safety on the ocean.

The present invention meets these objectives as follows:
An expanding width high-speed ocean going hull;
Safe decks around the cabin of the vessel;
A stern deck for boarding and for swimmers;
A retractable height cabin-top fly bridge, vessel control, and lounging deck;
A conventional recreational vehicle when on land.
A hybrid-electric drive system for use on land and water.

It is known in the art for amphibious vehicles to have expanding width hulls, but it is not known for motorhome, travel trailer, and bus sized amphibians to have such expanded hulls that are designed for high speed in ocean waves. See, for example, U.S. Pat. No. 3,941,074 (Millerbernd 1976) which shows a bus sized vehicle with the expanded hull resulting in a hull with a beam narrower than the vehicle, and with cantilevered side decks extending well out over the water, adding to the instability of the top heavy, narrow vessel. Further, the large cylinders used to lift the side decks terminate below the water on the hull, causing substantial resistance to an already slow speed hull displacement hull limited by physics to a maximum of miles per hour (mph). The formula to calculate the theoretical maximum displacement hull speed is 1.34× the square root of the hull's waterline length. Assuming the Millerbernd bus to be 40' long, multiplying 1.34 by the square root of 40 (6.32)=8.5 knots maximum hull speed (about 10 mph). Millerbernd also lacks a retractable height flying bridge and control station above the cabin.

Similarly, U.S. Pat. No. 1,634,932 (Cook 1925) suffers from the same resultant long-narrow displacement hull (limited to even slower speed by virtue of the overall length of the Cook hull being substantially shorter than the Millerbernd bus), and with the craft's low freeboard and short distance from the bottom of the windows to the water, making it unsuitable for offshore ocean use. Cook also lacks a retractable height flying bridge and control station above the cabin.

And while U.S. Pat. No. 5,243,924 (Mann 1993) shows an expandable hull forming a central hull with an outrigger pontoon attached by open struts to each side of the central hull, the resultant hull configuration remains a displacement hull limited to displacement formula speeds below 10 mph. The Mann craft also lacks cabin cruiser accommodations, decks, and a command flying bridge.

U.S. Pat. No. 5,687,669 (Engler 1997) similarly depicts an amphibian scheme where the widened hull results in a catamaran hull (two deep displacement hulls). Assuming the shown vehicle to be 20' in length, and multiplying 1.34 by the square root of 20 (4.5)=6 knots maximum hull speed (about 7 mph). Moreover, the pivoting scheme limits the maximum in-water width of the hull to about 110% to 115% of the vehicle width, which when applied to 30' and 40' long vehicles results in a narrow, top heavy, unstable vessel. Engler also lacks the cabin cruiser accommodations, walk around deck, and a command flying bridge.

So while there are various examples of amphibious vehicles in the prior art, none of are a full-functioning recreational vehicle (motorhome, motorcoach, travel trailer, 5th-wheel trailer, van, SUV, and the like) on land . . . and a full-functioning offshore high-speed planing hull flying bridge cabin cruiser when in the water. Consequently, my invention of an Amphibious Recreational Vehicle is a new utility.

SUMMARY OF THE INVENTION

An amphibious recreational vehicle (motorhome, trailer, SUV, and the like) of conventional RV height, width, and length restricted dimensions necessary to travel on highways and roads, and which upon entering the water, the bottom of the vehicle expands outwardly and upwardly to form a fast planing, wide-beam, ground effects cathedral type double-tunnel hull. The hull makes use of a dynamic air cushion to augment the planing of the hulls, owing to the ground effect created by compression of the ram air stream (and water vapor) rushing through the two tapered tunnels separating the three hulls. The wheels of the vehicle are simultaneously raised out of the water to eliminate parasite drag. The resultant hull is substantially wider than the cabin, providing ocean-going stability for the craft. The folded elements incorporated within the cabin rooftop, raise upward to form a traditional yacht flying bridge, complete with a windshield, steering station, seeing, mast, and safety rails. The resultant watercraft closely approximates the off-shore speed, seaworthiness, performance, stability, cabin space, main deck space and elevated flying bridge deck attributes of conventional yachts. And when on land, the craft is a fully functioning traditional recreational vehicle suited for fast highway travel, driving about towns, staying in RV parks, and camping in the wilderness. This amphibious recreational vehicle is an interrelated component divided from the inventor's previous Comprehensive Vehicle Construction And Hybrid Electric Drive System application.

BRIEF DESCRIPTION OF THE DRAWINGS

Other features and advantages of the present invention will be apparent from the following detailed descriptions of preferred embodiments thereof when read in conjunction with reference to the accompanying drawings, wherein.

DETAILED DESCRIPTION OF THE PREFERRED EMBODIMENTS

Figure 1:
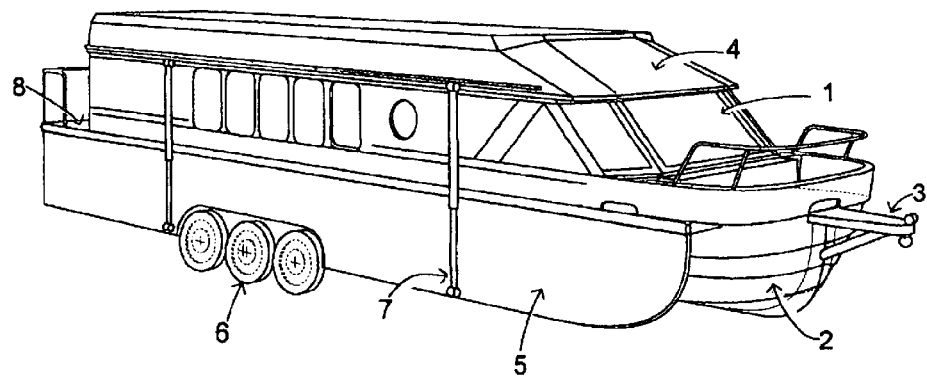
FIG. 1 is a perspective view of one embodiment of the invention depicting a representative Amphibious RV travel trailer configured for land use and travel.

FIG. 1 shows a perspective view of the embodiment of the invention depicting a representative Amphibious RV travel trailer configured for land use and travel. The Amphibious RV travel trailer is shown consisting of a cabin-body 1, a watertight central hull enclosing the bottom of the cabin-body 2, a tow hitch which doubles as a anchor pulpit 3, a watertight roof with a hidden flying bridge within its profile 4, a retractable outer-hull 5 on each side of the central hull, road wheels 6 within the outer-hulls, an arrangement of outer-hull raising-lowering supports 7, and a rear deck 8 beyond the cabin-body. In this land use configuration, the Amphibious RV functions as any typical travel trailer . . . having a maximum height, width, and length comparable with similar non-amphibious travel trailers.

Figure 2:
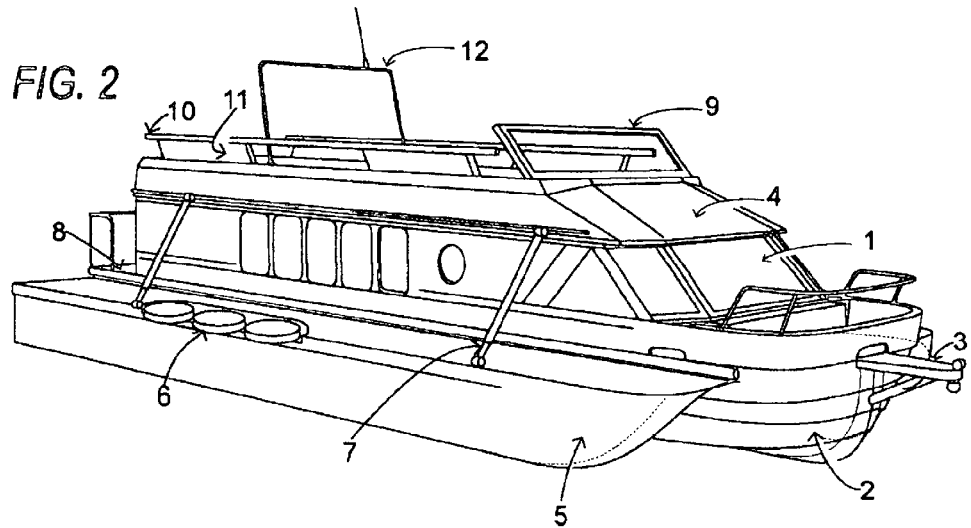
FIG. 2 is the same perspective view as FIG. 1, with the Amphibious RV travel trailer configured for use on water.
Figure 10:
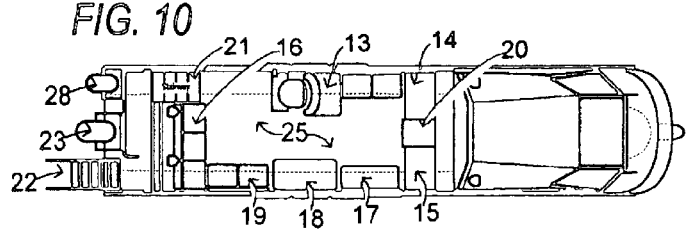
FIG. 10 is a top plan view of FIG. 8 showing the same Amphibious RV travel trailer, with the boarding stairs in the down position, and with the rooftop flying bridge deck raised for use.

FIG. 2 is the same perspective view as FIG. 1, with the Amphibious RV travel trailer configured for use on water. In operation, the Amphibious RV travel trailer is backed into the water, and the outer-hulls are pivoted upward to form a widened hull, and the flying bridge deck that was concealed within the rooftop is raised for use. Here in this view, the outer-hulls 5 are pivoted out and upward from the central hull 2 by means of the raising-lowering supports 7. The raising-lowering supports 7 are located above the water to eliminate speed reducing drag and turbulence within the water. The road wheels 6 are now positioned out of the water to further eliminate drag and turbulence associated with traditional amphibious land vehicles. The top surface of the rear deck 8 is well above the water surface in order to provide reserve buoyancy and to serve as a boarding area for swimmers and for boarding at docks. On the rooftop within the perimeter bulwarks which form the edges of the roof profile, the windshield 9 is raised, the perimeter safety handrails 10 are raised, the attached furniture backs 11 are raised, and the mast-antenna array 12 is raised for use at sea. Also on the rooftop within the perimeter of the bulwarks (as shown in FIG. 10) is a marine steering station 13, a barbecue 14, at wet-bar 15, a sleeping lounge 16, a refrigerator 17, a table 18, seating 19, a hatchway through the roof 20, and a stairway 21 down to the main deck and the cabin interior. Water propulsion is provided by means of outboard motors or by means of outboard-inboard motor(s).

Figure 3:
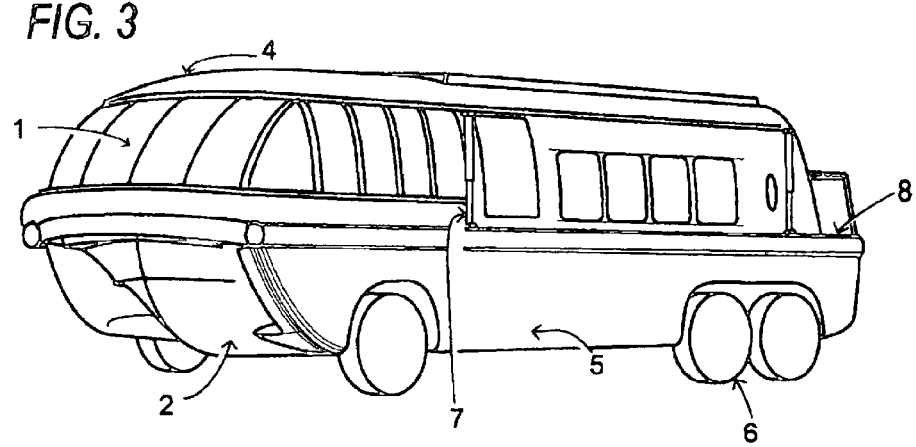
FIG. 3 is a perspective view of one embodiment of the invention depicting a representative Amphibious RV motorhome configured for land use and travel.

FIG. 3 is a perspective view of one embodiment of the invention depicting a representative Amphibious RV motorhome configured for land use and travel. The elements of the motorhome are similar to those of the Amphibious RV travel trailer, but with the addition of a road and water propulsion system. The Amphibious RV is shown consisting of a cabin-body 1, a watertight central hull enclosing the bottom of the cabin-body 2, a watertight roof with a hidden flying bridge within its profile 4, a retractable outer-hull 5 on each side of the central hull, road wheels 6 within the outer-hulls, an arrangement of outer-hull raising-lowering supports 7, and a rear deck 8 beyond the cabin-body. In this land use configuration, the Amphibious RV functions as any typical motorhome . . . having a maximum height, width, and length comparable with similar non-amphibious motorhomes.

Figure 4:
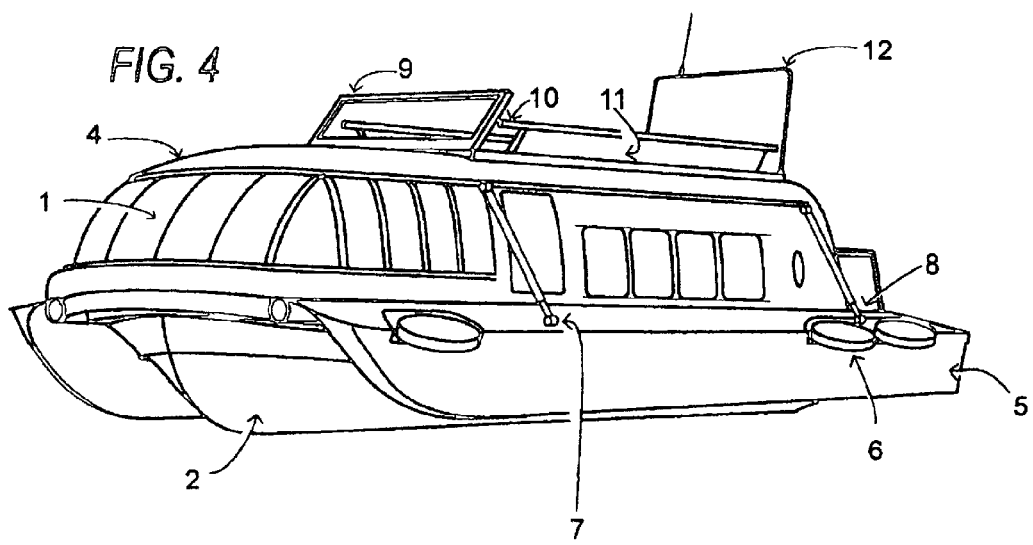
FIG. 4 is the same perspective view as FIG. 3, with the Amphibious RV motorhome configured for use on water.

FIG. 4 is the same perspective view as FIG. 3, with the Amphibious RV motorhome configured for use on water. In operation, the Amphibious RV motorhome is driven into the water, and the outer-hulls are pivoted upward to form a widened hull, and the flying bridge deck that was concealed within the rooftop is raised for use. Here in this view, the outer-hulls 5 are pivoted out and upward from the central hull 2 by means of the raising-lowering supports 7. The raising-lowering supports 7 are located above the water to eliminate speed reducing drag and turbulence within the water. The road wheels 6 are now positioned out of the water to further eliminate drag and turbulence associated with traditional amphibious land vehicles. The top surface of the rear deck 8 is well above the water surface in order to provide reserve buoyancy and to serve as a boarding area for swimmers and for boarding at docks. On the rooftop within the perimeter bulwarks which form the edges of the roof profile, the windshield 9 is raised, the perimeter safety handrails 10 are raised, the attached furniture backs 11 are raised, and the mast-antenna array 12 is raised for use at sea. Also on the rooftop within the perimeter of the bulwarks (as shown in FIG. 10) is a marine steering station 13, a barbecue 14, a wet-bar 15, a sleeping lounge 16, a refrigerator 17, a table 18, seating 19, a hatchway through the roof 20, and a stairway 21 down to the main deck and the cabin interior. Water propulsion is provided by means of marine waterjet(s).

Figure 5:
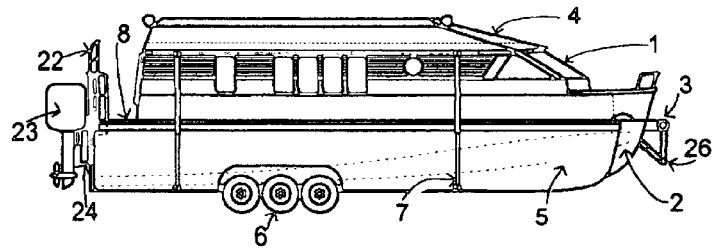
FIG. 5 is a side view of perspective FIG. 1 showing the same RV travel trailer configured for land use, with a tow hitch lowered, with an outboard engine and a boarding stairs in their raised positions.

FIG. 5 is a side view of perspective FIG. 1 showing the same RV travel trailer configured for land use, with a tow hitch lowered, with an outboard engine and a boarding stairs in their raised positions. In this view, the tow hitch-anchor pulpit 3 is shown with the tow hitch ball receiver 26 in the down position for towing by a vehicle. In operation, the hitch ball receiver is located at normal height above the ground for towing by a vehicle. When in the water, the hitch ball receiver pivots out of the water and is used as a pulpit for anchoring. Also shown is the rear boarding stairway 12 in the raised position, and a typical outboard engine 23 in the raised position for land travel. The engine 23 is attached to a vertical sliding track 24 affixed to the transom of the vehicle with a means to raise and lower the engine.

Figure 6:
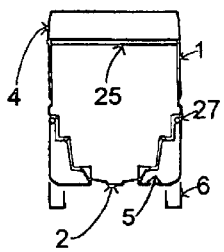
FIG. 6 is a typical cross-section of FIG. 5 showing the same Amphibious RV travel trailer with the wheels in the land use configuration.

FIG. 6 is a typical cross-section of FIG. 5 showing the same Amphibious RV travel trailer with the wheels in the land use configuration. In this view, the cabin-body 2 watertight central hull is shown in relation to the outer-hulls 5 and the road wheels 6. Also seen is the round pivot hinge 27 which connects the outer-hulls 5 to the central hull 2. In operation, the outer-hulls 5 are positioned under the central hull 2, to locate the road wheels on the ground. The rooftop deck 25 is shown within the bulwark perimeter of the watertight roof profile 4.

Figure 7:
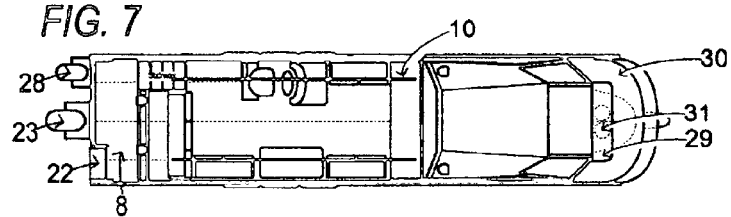
FIG. 7 is a top plan view of FIG. 5 showing the same Amphibious RV travel trailer, with the tow hitch lowered, with the outboard engine and the boarding stairs in their raised positions.

FIG. 7 is a top plan view of FIG. 5 showing the same Amphibious RV travel trailer, with the tow hitch lowered, with the outboard engine and the boarding stairs in their raised positions. Also shown at the rear (stern) of the craft is a second smaller outboard engine 28 near a centrally located larger outboard engine 23. Where inboard-outboard engine(s) are located under the rear deck 8, the outboard engines as shown would be replaced with steering outdrive(s). Also shown in this view is the rooftop flying bridge with the perimeter safety handrails 10 folded down within the perimeter footprint of the vehicle. Shown on the forward bow deck 30 is a bow seat 29 over the tops of propane tanks 31 located on the bow deck. Similarly, the seat and propane tanks can alternately be located in the rear deck 8 or in the flying bridge rooftop deck 25.

Figure 8:
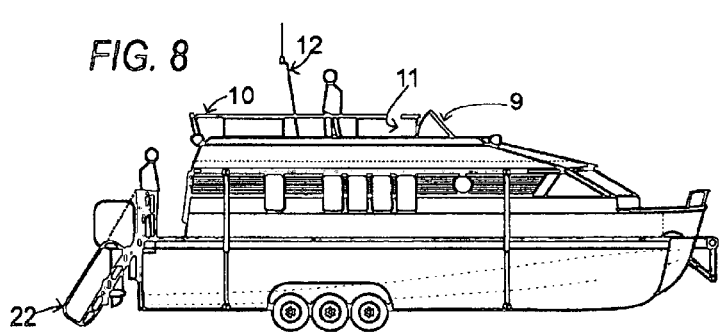
FIG. 8 is a side view of FIG. 5 showing the same Amphibious RV travel trailer configured for land use, with the boarding stairs in the down position, and with the rooftop flying bridge deck raised for use.

FIG. 8 is a side view of FIG. 5 showing the same Amphibious RV travel trailer configured for land use, with the boarding stairs 22 in the down position, and with the rooftop flying bridge deck elements raised for use. In operation, the windshield 9 and the perimeter safety landrails 10 are raised up for use. The antenna mast array 12 and the seat backs 11 are then folded up for use. These elements can be raised by hand or by a powered means. Similarly, the rear boarding stairway 22 is lowered to ground level. The stairway can be lowered and raised by hand, or by a suitable motive means.

Figure 9:
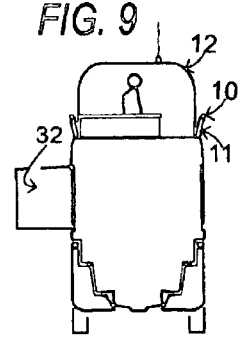
FIG. 9 is a cross-section of FIG. 8 showing the Amphibious RV travel trailer with the wheels in the land use configuration, and showing the rooftop flying bridge deck raised for use.

FIG. 9 is a cross-section of FIG. 6 showing the same Amphibious RV travel trailer with the wheels in the land use configuration, and showing the rooftop flying bridge deck elements of FIG. 8 raised for use. Also shown is a typical RV slideout 32 in the extended position. The slide out(s) can be located on any side of the vehicle.

FIG. 10 is a top plan view of FIG. 8 showing the same Amphibious RV travel trailer, with the boarding stairs 22 in the down position, and with the rooftop flying bridge deck elements raised for use. Shown is a stairway (ladder) 21 providing access to the rooftop deck 25, within the perimeter bulwarks which form the edges of the roof profile. The perimeter safety handrails, seat backs, and the mast are raised for use. Also within the perimeter of the rooftop bulwarks is a marine steering station 13, a barbecue 14, a wet-bar 15, a sleeping lounge 16, a refrigerator 17, a table 18, seating 19, a hatchway through the roof 20 with stairway 21 down to the cabin interior. In operation, the marine steering station 13 is generally used for operation of the craft on water. An interior steering station can be used as well.

Figure 11:
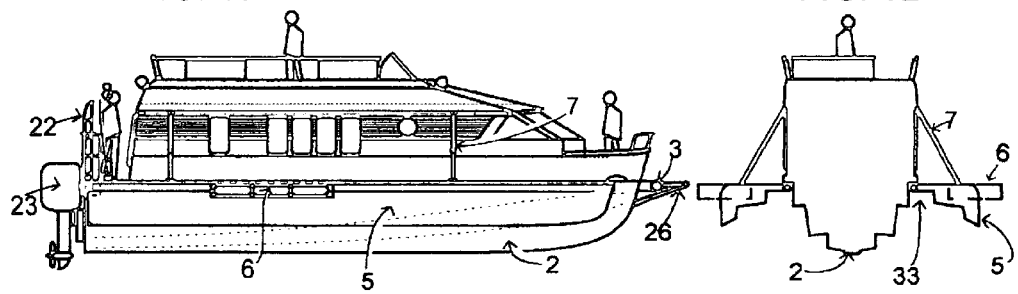
FIG. 11 is a side view of perspective FIG. 2 showing the same Amphibious RV travel trailer configured for water use, with the outer-hulls pivoted outward for use on water, the boarding stairs in the up position, the rooftop flying bridge deck raised for use, and with the outboard engine lowered into the water.

FIG. 11 is a side view of perspective FIG. 2 showing the same Amphibious RV travel trailer configured for water use, with the outer-hulls 5 outward for use on water, the boarding stairs 22 in the up position, the rooftop flying bridge deck elements raised for use, and with the outboard engine 23 lowered into the water. Also shown is the tow hitch-anchor pulpit 3 with the tow hitch ball receiver 26 in the raised position out of the water. The road wheels 6 are raised above the water and serve as side bumpers along side docks and other vessels.

Figure 12:
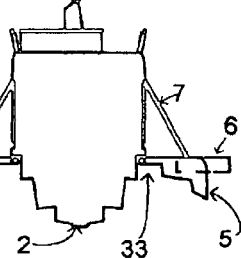
FIG. 12 is a typical cross-section of FIG. 11 showing the same Amphibious RV travel trailer with the outer-hulls pivoted outward for use on water, the road wheels raised above the water, and showing the rooftop flying bridge deck raised for use.

FIG. 12 is a typical cross-section of FIG. 11 showing the same Amphibious RV travel trailer with the outer-hulls 5 pivoted outward for use on water, the road wheels 6 raised above the water, and showing the rooftop flying bridge deck raised for use. The raising-lowering supports 7 are shown in their location above the water, which triangular truss structure forms a rigid widened hull. In this view, the expanded three-hulls (outer-hulls and the central hull) form a wide-beam cathedral hull, with a semi-enclosed tunnel 33 between the central hull 2 and each outer hull 5. Whereas other amphibians use pontoons extended from the sides of the vehicle when in the water to stop the vehicle from toppling over and capsizing, their extended pontoons are displacement outrigger hulls which limit the speed of the craft to displacement hull speeds in water (about 5 to 9 mph). In this invention, the resultant one-piece widened hull, with its integral tunnels and multiplicity of underwater planing surfaces, forms a fast planing marine hull capable of high speeds on water. Other amphibious land vehicles when in the water, also have speed reducing land-drive system axles, differentials, and wheels protruding under the water to produce drag which further restricts the craft from exceeding the limits of displacement hull speeds.

Figure 13:
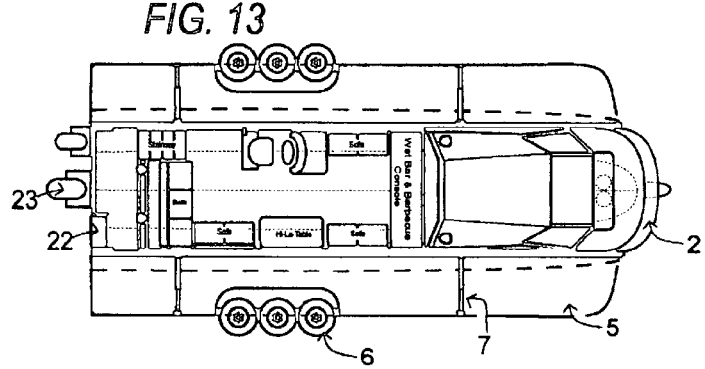
FIG. 13 is a top plan view of FIG. 11 showing the same Amphibious RV travel trailer with the outer-hulls pivoted outward for use on water, the boarding stairs in the up position, the rooftop flying bridge deck raised for use, and with the outboard engine lowered into the water.

FIG. 13 is a top plan view of FIG. 11 showing the same Amphibious RV travel trailer with the outer-hulls 5 pivoted outward for use on water, the boarding stairs 22 in the up position out of the water, the road wheels 6 out of the water, the rooftop flying bridge elements deck raised for use, and with the outboard engine 23 lowered into the water. In this top view it becomes obvious that the resultant one-piece widened hull approximately doubles the width of the vehicle, thus creating a highly stable wide-beam marine hull. Further, the resultant wide-beam hull provides the large underwater planing surfaces necessary for high speeds on water. Also seen in this view are the raising-lowering supports 7 shown in their location above the water.

Figure 14:
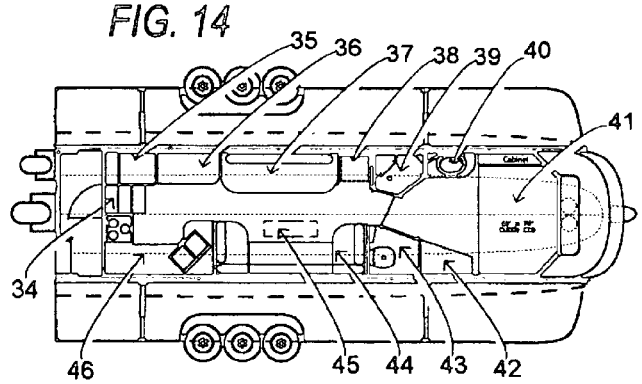
FIG. 14 is the same top plan view of FIG. 13 showing the same Amphibious RV travel trailer with the outer-hulls pivoted outward for use on water, and showing a typical interior floor plan within the cabin of the vehicle.

FIG. 14 is the same top plan view of FIG. 13 showing the same Amphibious RV travel trailer with the outer-hulls pivoted outward for use on water, but is showing a typical interior floor plan within the cabin of the vehicle. While any variety of interior floor plans are within the scope of the invention, this plan is shown to illustrate the amenities common to a conventional land travel trailer and common to a similar sized yacht that are embodied within this claimed Amphibious Recreation Vehicle. Starting down the cabin interior stairway 34 along the port side of the craft (street side of a land RV) is a refrigerator 35, a washer-dryer console 36, a sofa-bed 37, a TV-entertainment center 38, an enclosed shower-tub 39, a vanity & sink 40, and a queen-sized bed 41. And on the aboard side of the cabin (curb side of a land RV) is a full kitchen 46, a king-sized sofa-bed 44, a dining table 45, an enclosed bathroom 43, and a closet 42 within the forward master suite. The purpose of this illustration is to show those interior cabin elements which are normal to a powerboat cabin cruiser and similar marine vessels which are the subject of this invention.

Figure 15:
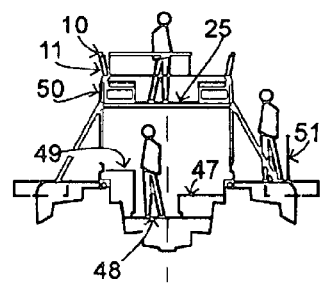
FIG. 15 is a typical cross-section of FIG. 14 showing the same Amphibious RV travel trailer with the outer-hulls pivoted outward for use on water, the road wheels raised above the water, showing the rooftop flying bridge deck raised for use, and showing a typical section of the interior cabin floor, seat, and counter relationship to a human.

FIG. 15 is a typical cross-section of FIG. 14 showing the same Amphibious RV travel trailer with the outer-hulls pivoted outward for use on waters the road wheels raised above the water, showing the rooftop flying bridge deck elements raised for use, and showing a typical section of the interior cabin floor 48, a typical sofa seat 47, and a counter 49 in relationship to a human. Also shown in this section is the flying bridge deck 25, the perimeter bulwarks 50 around the flying bridge deck, the affixed flying bridge deck seating with seat back raised 11, and the perimeter safety handrails 10. On the upper deck surface of the raised outer-hull is shown a representation of a human in relation to stanchions 51 (safety railing and lines) along the hull perimeter. The folding stanchions may be removable within the scope of this invention.

Figure 16:
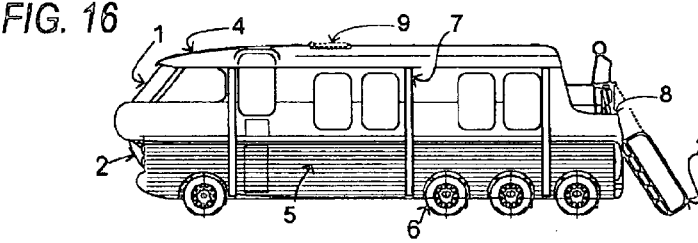
FIG. 16 is a side view of perspective FIG. 3 showing the same Amphibious RV motorhome configured for land use, and with the rooftop flying bridge deck closed.

FIG. 16 is a side view of perspective FIG. 3 showing the same Amphibious RV motorhome configured for land uses and with the rooftop flying bridge deck elements closed. Similar to the previously mentioned elements of the Amphibious RV travel trailer, this view shows the motorhome cabin-body 1, the central hull 2, the watertight roof with a hidden flying bridge within its profile 4, a retractable outer-hull 5 on each side of the central hull, road wheels 6 within the outer-hulls, an arrangement of outer-hull raising-lowering supports 7, and a rear deck 8 beyond the cabin-body. Also shown is the rear boarding stairway 22 in the lowered position for boarding, and the flying bridge windshield 9 shown in the lowered position.

Figure 17:
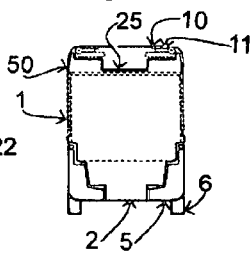
FIG. 17 is a typical cross-section of FIG. 16 showing the same Amphibious RV motorhome with the wheels in the land use configuration, and with the rooftop flying bridge deck closed.

FIG. 17 is a typical cross-section of FIG. 16 showing the same Amphibious RV motorhome with the wheels in the land use configuration, and with the rooftop flying bridge deck elements closed. Also shown similarly to the Amphibious RV travel tailer elements in this section are the cabin-body 1, the watertight central hull 2, the outer-hulls 5, and the road wheels 6, the rooftop flying bridge deck 25, the flying bridge perimeter bulwarks 50, and the seat backs 11 and the safety handrails 10 folded down in the land travel position.

Figure 18:
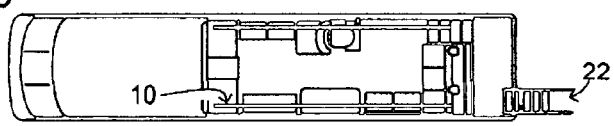
FIG. 18 is a top plan view of FIG. 16 showing the same Amphibious RV motorhome with the rooftop flying bridge deck closed.

FIG. 18 is a top plan view of FIG. 16 showing the same Amphibious RV motorhome with the rooftop flying bridge deck elements closed. Also shown are the boarding stairs 22 in their lowered position and a top view of the flying bridge. Shown in this view of the rooftop flying bridge are the perimeter safety handrails 10 folded down within the perimeter footprint of the vehicle.

Figure 19:
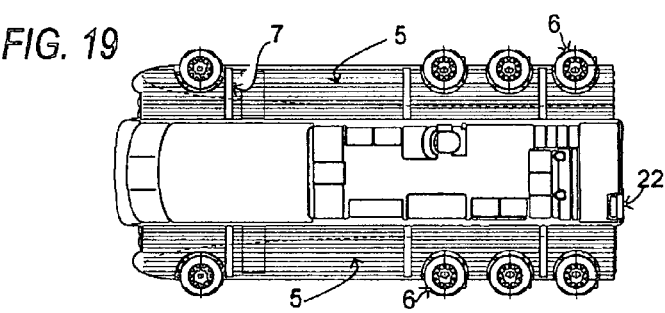
FIG. 19 is the same top plan view of FIG. 18 showing the same Amphibious RV motorhome with the rooftop flying bridge deck, and with the outer-hulls and road wheels pivoted outward for use on water.

FIG. 19 is the same top plan view of FIG. 18 showing the same Amphibious RV motorhome with the rooftop flying bridge deck, and with the outer-hulls 5 and road wheels 6 pivoted outward for use on water. Also shown are the boarding stairs 22 in the up position out of the water, and the rooftop flying bridge deck elements raised for use. In this top view it becomes obvious that the resultant one-piece widened hull of the Amphibious RV motorhome approximately doubles the width of the vehicle, thus creating a highly stable wide-beam marine craft. Further, the resultant wide-beam hull provides the large underwater planing surfaces necessary for high speeds on water. Also seen in this view are the raising-lowering supports 7 shown in their location above the water.

Figure 20:
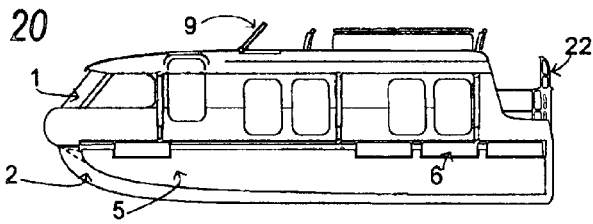
FIG. 20 is a side view of perspective FIG. 4 and of top plan view FIG. 19 showing the same Amphibious RV motorhome configured for water use, and with the rooftop flying bridge deck opened.

FIG. 20 is a side view of perspective FIG. 4 showing the same Amphibious RV motorhome configured for water use, and with the rooftop flying bridge deck opened. Seen are the outer-hulls 5 positioned outward for use on water, the boarding stairs 22 in the up position, and the rooftop flying bridge deck elements raised for use. Also shown are the road wheels 6 raised above the water and serving as side bumpers for use along side docks and other vessels.

Figure 21:
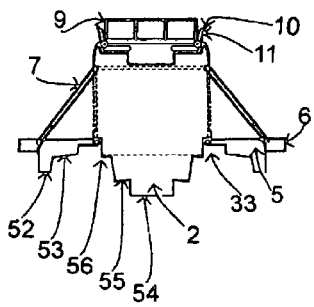
FIG. 21 is a typical cross-section of FIG. 20 showing the same Amphibious RV motorhome with the outer-hulls pivoted outward for use on water, the road wheels raised above the water, the rooftop flying bridge deck raised for use, and showing outer-hull raising-lowering supports in relation to the main body of the vehicle.

FIG. 21 is a typical cross-section of FIG. 20 showing the same Amphibious RV motorhome with the outer-hulls 5 pivoted outward for use on water, the road wheels 6 raised above the water, and the rooftop flying bridge deck elements raised for use. The raising-lowering supports 7 are shown in their location above the water, which triangular truss structure forms a rigid widened hull. In this view similar to the Amphibious RV travel trailer, the expanded three-hulls (outer-hulls and the central hull) form a wide-beam cathedral hull, with a semi-enclosed tunnel 33 between the central hull 2 and each outer-hull 5. Further inspection of FIG. 21 shows one embodiment of the hull cross-sectional shapes where there are a series of stepped planing surfaces (52, 53, 54, 55, and 56) surrounding the semi-enclosed tunnels 33. In this stepped planing surface hull shape embodiment, the stepped planing surfaces are designed to provide a multiplicity of hydro lifting surfaces (lifting strakes) which when the hulls are folded for land travel (as shown in FIG. 17) the various planing surfaces on the central hull 2 inter-mesh the various planing surfaces on the outer-hulls 5. Whereas other amphibians use pontoons extended from the sides of the vehicle when in the water to stop the vehicle from toppling over and capsizing, their extended pontoons are displacement outrigger hulls which limit the speed of the craft to displacement hull speeds in water (about 5to 9 mph). In this invention, the resultant one-piece widened hull, with its integral tunnels and multiplicity of underwater planing surfaces, forms a fast planing marine hull capable of high speeds on water. And while other amphibious bus-sized land vehicles have speed reducing land-drive system axles, differentials, and wheels protruding under the water that produce drag in the water, this invention eliminates all such drag items below the waterline. Also shown is the flying bridge windshield 9, the flying bridge perimeter safety handrails 10 and the flying bridge seat backs 11 raised for use.

Figure 22:
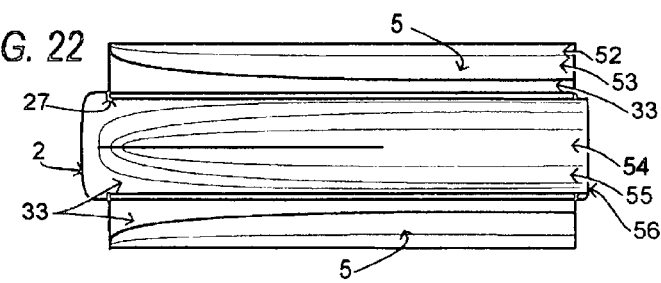
FIG. 22 is a bottom view of FIGS. 19, 20, and 21 showing a typical arrangement of the outer-hulls, the central hull, and semi-enclosed tunnel sections between the hulls.

FIG. 22 is a bottom view of FIGS. 19, 20, and 21 showing a typical arrangement of the outer-hulls 5, the central hull 2, and semi-enclosed tunnel sections 33 between the hulls. Also seen is the round pivot hinge 27 which connects the outer-hulls 5 to the central hull 2. In this view looking up at the bottom of the resultant one-piece hull, the craft has exceptional beam for excellent stability on the open sea, and it has the necessary planing surface areas required to plane the vessel above the water to achieve fast cabin cruiser speeds on the ocean.

Figure 23:
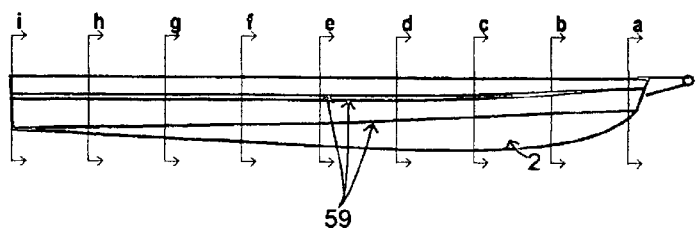
FIG. 23 is a side view illustration for one embodiment of a typical Amphibious Recreational Vehicle central hull, showing half-section lines (a through i) intersecting the hull.

FIG. 23 is a side view illustration for another embodiment of a typical Amphibious Recreational Vehicle central hull 2, showing half-section lines (a through i) intersecting the hull. For simplicity of illustration, the outer-hull is not shown as it would block the reader's view of the central hull lines. In contrast to FIG. 21 and FIG. 22, this drawing illustrates minimal planing surfaces 59 on the hull bottoms to demonstrate that any number and shape of planing surfaces on the outer-hulls 5 and on the central hull 2 are within the scope of the invention.

Figure 24:
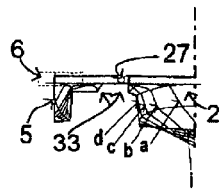
FIG. 24 is a half-section front (bow) view of FIG. 23 showing the various section lines (a through d and i) on the center hull, and showing an outer-hull (with road wheels), and a semi-enclosed tunnel between the hulls.

FIG. 24 is a half-section front (bow) view of FIG. 23 showing the various section lines (a through d and i) on the center hull 2, and showing an outer-hull 5 (with road wheels 6), the round pivot hinge between the hulls 27, and a semi-enclosed tunnel 33 between the hulls. The sections lines a, b, c, d, and i of FIG. 23 are represented in this view to illustrate the relationship of the hulls to the semi-enclosed tunnel 33 which in unison form a one-piece cathedral type planing hull in the water use mode.

Figure 25:
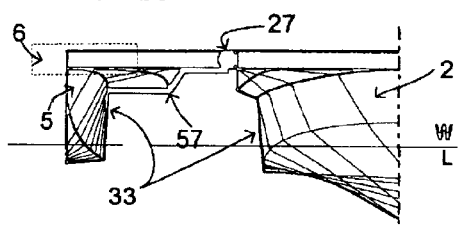
FIG. 25 is a similar half-section front (bow) view of FIG. 24 in larger scale, showing a tunnel tapering element against the upper area of the tunnel between the hulls in relation to the water surface.

FIG. 25 is a similar half-section front (bow) view of FIG. 24 in larger scale, showing a "tunnel tapering element" 57 against the upper area of the tunnel between the hulls in relation to the water surface. Also shown is a representative water level line (W/L) to illustrate the cross-sectional "air area" created by the semi-enclosed tunnel 33 bordered by its respective outer-hull 5, central hull 2, and the surface of the water (W/L). The tunnel tapering element 57 is a movable surface forming the upper rearward portion of the semi-enclosed tunnel 33. When the tunnel tapering element is lowered closer to the water, the front end (toward the bow) of the tunnel tapering element remains close to the top of the tunnel (farthest from the waterline), while the rearmost end is closer to the waterline, thus reducing the cross-sectional air area in the tunnel as the air within the tunnel moves rearward. As the hulls move forward on the water, the ram air stream captured within the tunnels is compressed as it moves toward the smaller cross-sectional exit at the rearmost end of the tunnels. The compressed air, ladened by great amounts of splashed water (water is substantially un-compressible) ramming rearward through the tapering tunnel, lifts the rear portions of tunnel hulls upward above the water to assist the planing surfaces of the hull in lifting the craft on a fast plane. The forward upper section of the tunnel, which spans the bows of the hulls, acts effectively similar to an aircraft wing close to the ground so that, owing to the ground effect, the hull makes use of a dynamic air cushion to further augment the planing of the hulls. While any means to provide dynamic lift to the resultant Amphibious Recreational Vehicle cathedral hull is within the scope of this invention, the tunnel tapering element best illustrates the incorporated principle of the invention.

Figure 26:
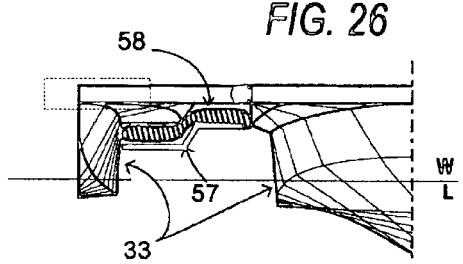
FIG. 26 is the same half-section front (bow) view of FIG. 25 showing the tunnel tapering element lowered toward the water . . . reducing the air volume between the bottom surface of the tapering element and the water and the hulls.

FIG. 26 is the same half-section front (bow) view of FIG. 25 showing the tunnel tapering element 57 lowered toward the water . . . reducing the air volume between the bottom surface of the tapering element and the water and the hulls. In this drawing, a representative bladder 58 is shown between the tunnel tapering element 57 and the upper portion of tunnel 33 acting as one method to move the tunnel tapering element downward, and which also assists in sealing the joints of the resultant tapered tunnel. While any method to lower and retract, and or to assist in sealing the tunnel tapering element is within the scope of this invention, this bladder 58 application aides in describing the concept to the reader.

Figure 27:
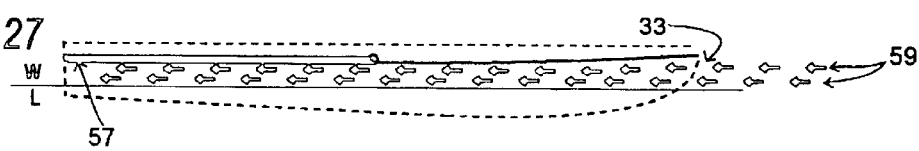
FIG. 27 is a schematic longitudinal section of the tunnel tapering element as seen in FIG. 25, showing a side view of the hull, the top of the tunnel section between an outer-hull and the central hull, and the tunnel tapering element in its up most position.

FIG. 27 is the same side view as shown in FIG. 23 showing a schematic longitudinal section of the tunnel tapering element 57 in relationship to the underside of the semi-enclosed tunnel 33 between the hulls. The cross-sectional lines (a through i) and the chine lines 59 as seen in FIG. 23 have been removed to clarify the view of the tunnel tapering element 57 for the reader. The arrows 59 represent the flow of air entering the tunnel between the hulls as the craft moves forward. In this FIG. 27, the tunnel tapering element 57 is shown in its raised position which allows the outer-hull 33 to hinge downward against the central hull 2 without interference when closed for land use travel and storage. Air moving rearward through the tunnel is horizontally compressed as the tunnel narrows rearward caused by the adjacent hulls widening toward the rear. While this horizontal compression aides in lifting the hulls above the water, concurrent vertical compression of the air as it moves rearward would further assist in lifting the stern of the hulls from the water.

Figure 28:
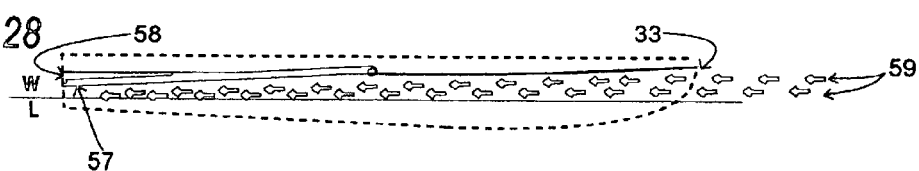
FIG. 28 is the same schematic longitudinal section of FIG. 27, showing the tunnel tapering element in its lowered position, as it compresses air as it moving back through the tunnel between the hulls.

FIG. 28 is the same schematic longitudinal section of FIG. 27, showing the tunnel tapering element 57 in its lowered position, as it vertically compresses air moving back through the tunnel. In this view, the rear end of the tunnel tapering element 57 is closer to the water surface than its front edge. This causes a continual tapering of the vertical cross-sectional area between the hulls as the ram air moves rearward, further compressing the ram air before it exits the hull. The further compression of the air additionally assists the hulls in rising above the water surface to reach a planing attitude. The bladder 58 illustrates its use above the tunnel tapering element 57.

FIG, 29 is a side view illustration similar to FIG. 23 showing an embodiment with a hydrofoil wing 60 under the stern of the vehicle. The hydrofoil wing 60, within the scope of this invention, is an additional means for assisting the Amphibious Recreational Vehicle onto a plane upon the surface of the water. The angle of incident to the hull and to the water provides additional planing surfaces to the hull, within the footprint of the vehicle in the land travel mode. Where a typical airfoil cross-section is used on the wing, additional upward lift is attained. The hydrofoil wing is located on the hull in a manner which allows the outer-hulls and the central hull to be closed for land travel and storage. While one hydrofoil wing is shown for simplicity of illustration, a multiplicity of hydrofoil wings is within the scope of this invention.

Figure 29:
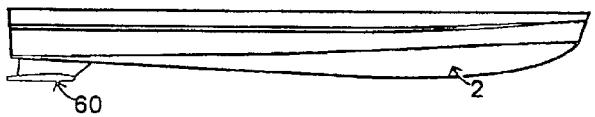
FIG. 29 is a side view illustration similar to FIG. 23 showing an embodiment with a hydrofoil wing under the stern of the vehicle.
Figure 30:
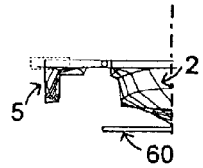
FIG. 30 is a half-section front (bow) view of FIG. 29 showing the hydrofoil wing under the stern of the vehicle with the hulls open in the water use mode.

FIG. 30 is a half-section front (bow) view of FIG. 29 showing the hydrofoil wing 60 under the stern of the central hull 2 with the outer-hulls 5 open for use in the water.

Figure 31:
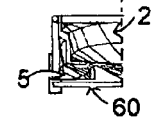
FIG. 31 is the same half-section front (bow) view of FIG. 30 showing the hydrofoil wing under the stern of the vehicle with the hulls in the closed position for land travel and storage.

FIG. 31 is the same half-section front (bow) view of FIG. 30 showing the hydrofoil wing 60 under the central hull 2 of the vehicle with the hulls in the closed position for land travel and storage. As is illustrated in this drawing, the operation of the outer-hulls 5 does not interfere with the placement of the hydro-foil wing.

Figure 32:
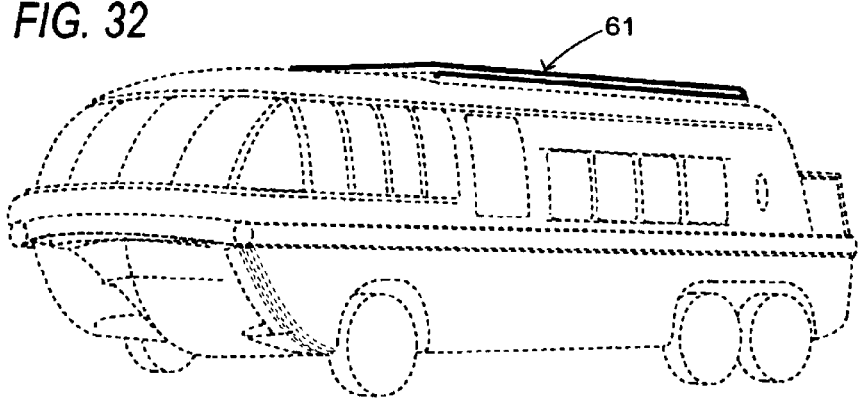
FIG. 32 is a perspective illustration similar to FIG. 3 showing an embodiment of an Amphibious RV with a raising flying bridge deck cover in the lowered position for land travel.

FIG. 32 is a perspective illustration similar to FIG. 3 showing an embodiment of a Amphibious RV with a raising flying bridge deck cover 61 in the lowered position for land travel. In this position, the flying bridge deck cover serves to protect the flying bridge elements from dirt and inclement weather when not being used.

Figure 33:
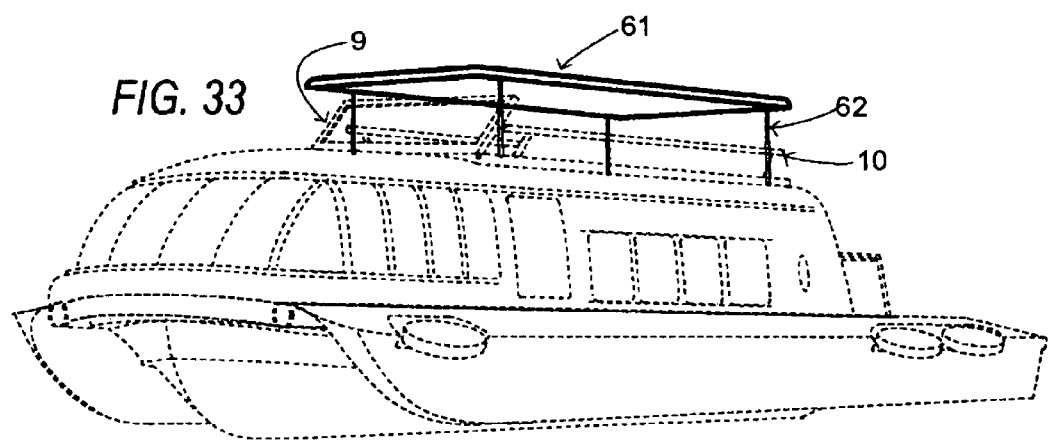
FIG. 33 is a perspective illustration similar to FIG. 4 showing an embodiment of an Amphibious RV with a raising flying bridge deck cover in its raised position above the deck, and above the safety rails, the windshield, and the flying bridge deck furniture.

FIG. 33 is a perspective illustration similar to FIG. 5 showing an embodiment of a Amphibious RV with a raising flying bridge deck cover 61 in its raised position above the deck, and above the safety handrails 10, the windshield 9, and the flying bridge deck furniture. The raising flying bridge deck cover 61 is supported by extensible posts 62 along the approximate perimeter of the cover. The bottom of the extensible posts 62 are concealed within tubes in the exterior cabin-body walls and or are collapsible above the flying bridge deck level by means of telescoping within themselves (telescoping extensible posts) and or folding posts similar to the folding system used for the safety handrails 10. While the preferred embodiment uses a suitable means to raise and lower the cover by a suitable power system (electric, hydraulic, pneumatic motors or linear actuator, and the like), the raising and lowering of the cover can be by manual means within the scope of the invention.

Figure 34:
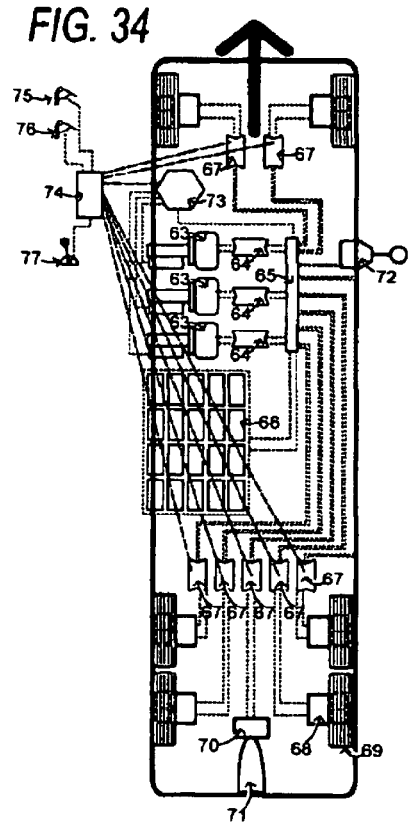
FIG. 34 is schematic diagram depicting one embodiment of an Amphibious Recreational Vehicle multi-engine hybrid-electric system.

FIG. 34 is schematic diagram depicting one embodiment of an Amphibious Recreational Vehicle multi-engine hybrid-electric system. While mechanical drive systems (transmission, rotating shafts, differential, and the like) and hydraulic drive systems are within the scope of this invention, the preferred embodiment is a hybrid-electric drive system where the road wheels are individually driven by individual electric motors and the electrical generation source is provided by a multiplicity of inexpensive engine-generators.

The unique basis of this system consists of a multiplicity of small electrical power generation units running at each individual's optimum efficiency which are used in combination to provide the electrical power necessary to run the drive wheel motors, charge the battery bank, or to do both. In traditional hybrid-electric applications, a single internal combustion engine is used to provide electrical power by turning an electrical generating device (generator, alternator, and the like). In small vehicles like automobiles, there are a great number of high-production low-cost internal combustion engines suitable for producing sufficient electrical power for the automobile size vehicle's electric wheel drive motor. The same application in large bus, truck, and motor-home sized vehicles traditionally requires a much larger ICE to meet the much greater electrical power demands of these large scale vehicles. But, because large sized internal combustion engines (usually diesel) that are suitable for these large scale vehicles are made in limited low-volume production quantities, their unit costs, repair parts costs, and maintenance labor are significantly disproportionate in capital costs when compared to the high-volume mass-production automotive engines. In this invention, multiple small inexpensive engine-generator units are used instead of a large engine-generator producing the same amount of electrical power. The benefits of multiple small inexpensive engine-generator units is that the resultant engine capital cost is lower, the vehicle reliability is significantly increased, fuel economy is greatly increased, atmosphere pollutants are decreased, the center of gravity of the vehicle can be lower, the interior utilization of vehicle space is enhanced, maintenance is easier, and multiple generation sources (fuel cell, turbine, land line) can be utilized interchangeably.

In the Amphibious Recreation Vehicle of this invention where the road drive wheels are located within moveable outer-hulls separated from the main machinery area of the central hull, and where the drive wheels lift out of the water . . . the simplicity of using electrical cables between the motor drive wheels and the power source is superior to the complexity & weight of an equivalent mechanical drive system. Moreover, when entering and exiting the water, all wheel drive is a requirement. Also when entering the water, a combination of road wheel drive and marine propulsion drive is required. But when the road wheels are raised out of the water, the motion of the road wheels must stop for safety and conservation of power, and the majority of the motive power available in the vehicle must be used for the marine propulsion. In this hybrid-electric drive, an electric motor drives the marine propulsion unit, as is the case with the Navy's fast diesel-electric naval vessels.

In operation, the primary source of developing electrical power is from a number of small Gensets 63 connected to a Battery Interface Switch 65. A Genset 63 is composed of a small diesel or other type fuel engine that drives a high output generator or alternator. Where an alternator is used, a Genset Controller 64 converts the electrical output to DC for storage into the Battery Pack 66. Optionally, the AC electrical output is routed through a switcher directly to the Road Wheel Drive Motors 68 or to the Marine Propulsion Motor 70. The Gensets 63 can be augmented or replaced by fuel cells with the scope of this invention. The Battery Pack 66 also receives electrical energy from the Road Wheel Drive Motors 68 when they are used to slow the vehicle (regenerative braking), and from the shore power electrical grid 72, and from solar cells and wind generators atop the vessel (common on cruising sailboats and RVs).

Each Road Wheel Drive Motor 68 is connected to a Tired Wheel 69, which is independently suspended from its mounting point on the vehicle. And each Tired Wheel 69 is capable of being steered, where an all-steering vehicle is needed. The Marine Propulsion Motor 70 is connected to a waterjet or propeller (the waterjet is preferred for safety) Marine Propulsion Unit 71. Where the Road Wheel Drive Motors 68 and or the Marine Propulsion Motor(s) 70 use AC current, Motor Controllers 67 make the conversion between AC and DC power and control the power input to the respective motor. A Central Component Management Unit 73 monitors input and output signals of all components, and controls the operation of the Gensets 63, the Battery Interface Switch 65 which controls the power to each motor and controls the battery charge & discharge rate, the battery box temperature and the battery fluid levels, and interfaces with the Vehicle Controller 74. The Vehicle Controller 74 provides signals from the gas pedal 75, the brakes 76, the throttle quadrant 77, the turn indicators, the steering wheel, and the vehicle accessories & ancillary equipment and links them to the Central Component Management Unit 73.

For example, when the gas pedal 75 is depressed, the Vehicle Controller 74 signals the Central Component Management Unit 73 which activates the Battery Interface Switch 65 to provide electrical power to the Road Wheel Drive Motors 68 (via the Motor Controllers 67 where applicable). Depending upon the mode selected, all wheels are driven or only the selected set of wheels. The functions of positive-traction and differential rotating rates of the wheels in turn is controlled by the Central Component Management Unit 73. When the brake pedal is depressed 76, the Road Wheel Drive Motor 68 is switched to function as an electrical generator which slows the vehicle depending upon the pressure on the pedal, and then the disc brakes in the Tired Wheel 69 completes the stopping of the wheel. The electrical power generated in the wheel when being braked is stored in the Battery Pack 66.

While the Road Wheel Drive Motors 68 and the Marine Propulsion Motor(s) 70 normally draw their electrical energy from the Battery Pack 66 alone, for short term peak demand power requirements in extreme acceleration situations, the electrical energy output of the Gensets 63 in series-parallel with the electrical energy of the Battery Pack 66 is available to the motors. This combined series-parallel use of the Gensets and the Battery Pack provides substantially more electrical demand energy to the motors than otherwise possible.

In operation for entering the water, all the Road Wheel Drive Motors 68 are powered, so that the Tired Wheels 69 remaining on the bank have land traction. For example, upon entering the water, the front set of Tired Wheels 69 will be floating in the water, which requires that the Tired Wheels 69 remaining on land provide motive power to the vehicle. When the Tired Wheels are fully in the water and the vehicle is floating, the Tired Wheels can no longer propel the vehicle. Then the Marine Propulsion Motor 70 is powered which propels the vessel from shore with the Marine Propulsion Unit 71. The Road Wheel Drive Motors 68 are stopped and the outer-hulls are lifted from the water. For the vehicle to leave the water and drive on land, the operation is reversed.

The Battery Pack 66 provides an additional benefit to the Amphibious Recreational Vehicle as RVs and cabin cruiser yachts normally are equipped with stand-alone generators and large battery banks to provide electrical energy when the RV is parked (or the vessel is anchored). These systems and weight are eliminated with this hybrid-electric system, as the Battery Pack 66 and Gensets 63 meet this need.

Figure 35:
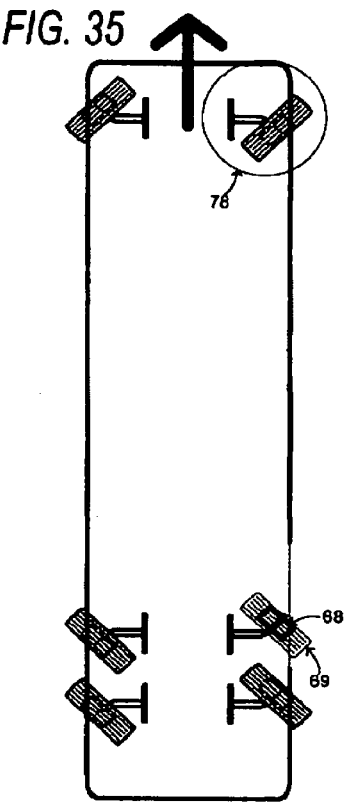
FIG. 35 is schematic diagram depicting one embodiment of an Amphibious Recreational Vehicle multi-engine hybrid-electric system with all-wheel steering.

FIG. 35 is schematic top view diagram depicting one embodiment of an Amphibious Recreational Vehicle multi-engine hybrid-electric system with all-wheel steering. Here, the Road Wheel Drive Motor 68 is located within the Tired Wheels 69 to provide a more compact configuration, and is joined with a suitable suspension system (double wishbone, trailing arm, and the like) to form a Universal-Motor Power Suspension Module 78. Where the suspension is a double wishbone type, the Road Wheel Drive Motor 68 output shaft is connected to a universal jointed drive-line in the Double Wishbone Suspension Wheel Assembly. The Double Wishbone Suspension Wheel Assembly consists of: the base anchor structure which affixes to the vehicle where the base anchor structure houses the Road Wheel Drive Motor 68, an upper and a lower suspension A-arm pivotally affixed to a rotating axle spindle for steering the wheel, a spring and spring dampener (shock absorber), a drive shaft with universal joints at each end, a disc brake, and a Tired Wheel 69.

The same Universal-Motor Power Suspension Module 78 is used at all sides and ends of a vehicle, so only one type of module is required to construct a vehicle with three or more wheels. When used as a steerable wheel, the steering link between opposing wheels on each side of a vehicle are linked to the steering system (electric, hydraulic, mechanical, and the like). When non-steering wheels are utilized, a locking link is attached between the wheel steering attachment point and an attachment point on the suspension A-arm to immobilize the spindle. When non-motor driven suspension is desired, the motor and drive shaft are eliminated in the Universal-Motor Power Suspension Module 78.

One embodiment of the Universal-Motor Power Suspension Module 78 is shown applied in FIG. 35 to a six wheel vehicle. While any number of wheels on a vehicle is within the scope of this invention, six wheels are shown for illustrative clarity. Herein, the two front wheels are steerable, although in applications where heavier loads or more traction is desirable, a multiplicity of front steerable wheels are within the scope of the invention. The front wheels can be powered by electric drive motors, or they can be non-powered and free-turning within the scope of the invention. Similarly, the rear wheels are shown in the steerable mode. Utilization of the aforementioned locking link affixes the wheels in a non-steerable mode. And similar to the front wheels, any number of the wheels may be non-powered and free-turning within the scope of the invention.

Figure 36:
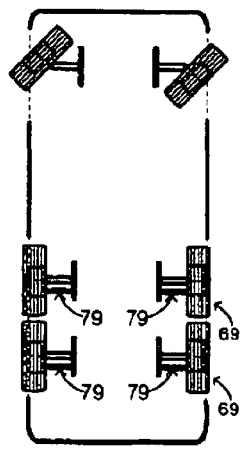
FIG. 36 is schematic diagram depicting one embodiment of an Amphibious Recreational Vehicle multi-engine hybrid-electric system with front-wheel steering, and showing a steering locking link on the rear wheels.

FIG. 36 is schematic diagram depicting one embodiment of an Amphibious Recreational Vehicle multi-engine hybrid-electric system with front-wheel steering, and showing a steering locking link on the rear wheels. The locking link 79 immobilizes the steering capability of the wheel 69 by holding the wheel to be parallel with sides of the vehicle.

Figure 37:
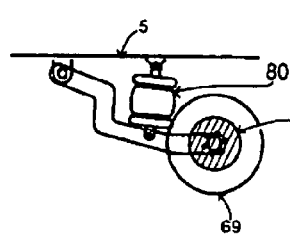
FIG. 37 is schematic side view diagram depicting one embodiment of an Amphibious Recreational Vehicle multi-engine hybrid-electric system Universal-Motor Power Suspension Module showing an adjustable-height suspension.

FIG. 37 is schematic side view diagram depicting one embodiment of an Amphibious Recreational Vehicle multi-engine hybrid-electric system Universal Motor Power Suspension Module showing a typical adjustable-height suspension. In this example, a common suspension air-bag spring 80 controls the ride height of the outer-hull 5 above the tired wheels 69 by adjusting the amount of air retained within the bag-bag spring, which in turn adjusts the height of the vehicle, Also shown diagrammatically is the Road Wheel Drive Motor 68.

Figure 38:
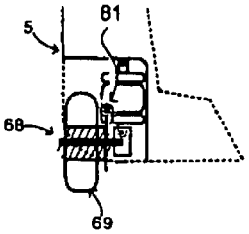
FIG. 38 is schematic end view diagram of FIG. 37 depicting one embodiment of an Amphibious Recreational Vehicle multi-engine hybrid-electric system Universal-Motor Power Suspension Module showing a disc brake.

FIG. 38 is schematic end view diagram of FIG. 37 depicting one embodiment of an Amphibious Recreational Vehicle multi-engine hybrid-electric system Universal-Motor Power Suspension Module showing a disc brake 81. In this embodiment, the disc brake 81 is shown on the inboard side of the Road Wheel Drive Motor 68. Also shown for reference is a cross section of the outer-hull 5.

PARENT CASE TEXT

This is a continuation-in-part of application Ser. No. 10/177,314, filed Jun. 24, 2002, now U.S. Pat. No. 6,679,543, and entitled "Comprehensive Vehicle Construction And Hybrid Electric Drive System, which is a continuation-in-part of my patent application Ser. No. 09/766,996, filed Jan. 23, 2001, now U.S. Pat. No. 6,425,625, and entitled "Rooftop Deck Systems For Vehicles" and a continuation-in-part of my patent application Ser. No. 10/142,403, filed May 10, 2002, now abandoned, and entitled "Seating Handrails and Canopy For Rooftop Systems".

Elements from my previous U.S. Pat. No. 6,237,988—Streamline Rooftop Deck For Motorhomes, and from my U.S. Pat. No. 6,425,625 Rooftop Deck Systems For Vehicles.

I claim:

1. An amphibious recreational vehicle comprising:
   a rooftop fold-down flying bridge deck consisting of a bulwarks on multiple sides of the roof top, a plurality of fold-down safety rails on multiple sides of the rooftop, and a plurality of fold-down seating affixed to the rooftop;
   a rooftop steering station within the rooftop fold-down flying bridge deck;
   a cabin below the rooftop fold-down flying bridge deck;
   an expandable width watertight hull below the cabin which consists of outer-hulls hinged to a central hull, when expanded, forms a one-piece wide-beam modified cathedral planing hull comprising:
   a central hull;
   an outer-hull on each longitudinal side of the central hull;
   a plurality of planing surfaces on the hulls;
   a plurality of land travel wheels within the outer-hulls;
   a hinge mechanism coupling the outer-hulls as to be pivotally positioned under the central hull for land travel, and positioned adjacent to the central hull for water travel while also raising the land travel wheels out of the water;
   a powered actuator to pivot the hulls between the land travel and water travel positions where the powered actuator is fully above the waterline for water travel;
   a ground effects lifting tunnel between the hulls;
   and a provision for marine propulsion.

2. The amphibious vehicle of claim 1, wherein a movable tapering device reduces the cross-sectional area in the rearward portion of the ground effects lifting tunnel to increase dynamic lift.

3. The amphibious vehicle of claim 1, wherein one or more hydrofoils under the central hull are positioned to allow the outer-hulls to pivot without interference with the hydrofoils.

4. The amphibious vehicle of claim 1, wherein the vehicle is a towable travel trailer.

5. The amphibious vehicle of claim 1, wherein the vehicle is a motorhome.

6. The amphibious vehicle of claim 1, wherein the vehicle is a truck, van, bus, motorhome, or a trailer.

7. The amphibious vehicle of claim 1, wherein the flying bridge has a fold-down windshield.

8. The amphibious vehicle of claim 1, wherein the flying bridge has a fold-down mast array.

9. The amphibious vehicle of claim 1, wherein a rear boarding deck with an affixed deployable stairway provides a means for access from the ground to the cabin when the vehicle is on land.

10. The amphibious vehicle of claim 1, wherein a marine propulsion unit is located within the hull(s).

11. The amphibious vehicle of claim 1, wherein it is a motorhome, truck, van, bus, or a trailer, where each of the land travel wheels are modular & interchangeable Universal-Motor Power Suspension Modules, each being powered with an integral electric drive motor-regenerative braking generator, and where the marine propulsion source is powered by electric motors that are all cabled to a central energy source of Energy Storage Units including storage sources of batteries and or capacitors, and a multiplicity of Gensets of electrical energy;
   and all coupled by means of a central controller for providing individualized current flow between motors and energy sources with a protocol of operating the minimum number of Gensets at any one time as is adequate for meeting the current energy demands of the Energy Storage Units and the motors, and where the Energy Storage Units and the Gensets act in series-parallel for extreme incremental peak demands of the motors;
   and where each Universal-Motor Power Suspension Module is comprised of:
   the integral electric drive motor-regenerative braking generator;
   a wheel, disc brake, and tire;
   a means of independent suspension;
   a pivot means for directionally steering the wheel;
   a link means for locking the direction of the wheel steering to one position;
   an adjustable wheel-to-vehicle ride-height means;
   and where the Universal-Motor Power Suspension Modules are interchangeably used on both sides of the vehicle.

12. The amphibious vehicle of claim 1, where the rooftop fold-down flying bridge deck has a raising and lowering cover, which in the lowered position covers the flying bridge deck and when raised is a canopy to protect the occupants from the sun and rain.

13. The amphibious vehicle of claim 1, where the vehicle has an interior space expanding slide-out on one or more sides of the cabin.

14. An amphibious recreational vehicle comprising:
   a recreational vehicle cabin;
   an expandable width watertight hull below the cabin which consists of outer-hulls hinged to a central hull, when expanded, forms a one-piece wide-beam modified cathedral planing hull comprising:
   a central hull;

an outer-hull on each longitudinal side of the central hull;

a plurality of planing surfaces on the hulls;

a plurality of land travel wheels within the outer hulls;

a hinge mechanism coupling the outer-hulls as to be pivotally positioned under the central hull for land travel, and positioned adjacent to the central hull for water travel while also raising the land travel wheels out of the water;

a powered actuator to pivot the hulls between the land travel and water travel positions where the powered actuator is fully above the waterline for water travel;

a ground effects lifting tunnel between the hulls;

a movable tapering device to reduce the cross-sectional area in the rearward portion of the ground effects lifting tunnel to increase dynamic lift;

and a provision for marine propulsion.

15. The amphibious vehicle of claim 14, wherein upon the cabin rooftop is a fold-down flying bridge deck consisting of bulwarks on multiple sides of the roof top, a plurality of fold-down safety rails on multiple sides of the rooftop, a rooftop steering station, and a plurality of fold-down seating affixed to the rooftop.

16. The amphibious vehicle of claim 14, wherein one or more hydrofoils under the central hull are positioned to allow the outer-hulls to pivot without interference with the hydrofoils.

17. The amphibious vehicle of claim 14, wherein the vehicle is a towable travel trailer.

18. The amphibious vehicle of claim 14, wherein the vehicle is a motorhome.

19. The amphibious vehicle of claim 14, wherein the vehicle is a truck, van, bus, motorhome, or a trailer.

20. An amphibious land vehicle comprising:

a land vehicle body of a car, truck, trailer, motorhome, or bus;

an expandable width watertight hull below the body which consists of outer-hulls hinged to a central hull, when expanded, forms a one-piece wide-beam modified cathedral planing hull comprising:

a central hull;

an outer-hull on each longitudinal side of the central hull;

a plurality of planing surfaces on the hulls;

a plurality of land travel wheels within the outer-hulls;

a hinge mechanism coupling the outer-hulls as to be pivotally positioned under the central hull for land travel, and positioned adjacent to the central hull for water travel while also raising the land travel wheels out of the water;

a powered actuator to pivot the hulls between the land travel and water travel positions where the powered actuator is fully above the waterline for water travel;

a ground effects lifting tunnel between the hulls;

a movable tapering device to reduce the cross-sectional area in the rearward portion of the ground effects lifting tunnel to increase dynamic lift;

and a provision for marine propulsion.

21. The amphibious vehicle of claim 20, wherein upon the land vehicle body rooftop is a fold-down flying bridge deck consisting of bulwarks on multiple sides of the roof top, a plurality of fold-down safety rails on multiple sides of the rooftop, a rooftop steering station, and a plurality of fold-down seating affixed to the rooftop.

22. The amphibious vehicle of claim 20, wherein one or more hydrofoils under the central hull are positioned to allow the outer-hulls to pivot without interference with the hydrofoils.

23. The amphibious vehicle of claim 20, wherein the land drive wheels and marine propulsion units are powered by their individual motors, which are all cabled to a central energy source of Energy Storage Units including storage sources of batteries and or capacitors, and a multiplicity of Gensets of electrical energy, so coupled by a central controller to provide individualized current flow between motors and energy sources with a protocol of operating the minimum number of Gensets at any one time as adequate for meeting the current energy demands of the Energy Storage Units and the motors, and where the Energy Storage Units and the Gensets act in series-parallel for extreme incremental peak demands of the motors.

* * * * *